United States Patent [19]

Seki

[11] Patent Number: 4,693,694
[45] Date of Patent: Sep. 15, 1987

[54] TOY WITH MOVING SCREEN

[75] Inventor: Yoshizo Seki, Tokyo, Japan

[73] Assignee: Tomy Kogyo Co., Inc., Tokyo, Japan

[21] Appl. No.: 833,816

[22] Filed: Feb. 26, 1986

Related U.S. Application Data

[63] Continuation-in-part of Ser. No. 665,101, Oct. 26, 1984, Pat. No. 4,573,928.

[30] Foreign Application Priority Data

Dec. 10, 1983 [JP] Japan ............... 58-190812[U]

[51] Int. Cl.⁴ .................. A63H 33/30; G09B 3/02
[52] U.S. Cl. .................... 446/197; 434/348; 434/176; 434/232
[58] Field of Search ............... 40/436, 437, 438, 439, 40/454, 477; 434/348, 324, 167, 176, 227, 228, 232; 446/176, 180, 197, 491, 198

[56] References Cited

U.S. PATENT DOCUMENTS

| | | | |
|---|---|---|---|
| 2,507,975 | 5/1950 | Hotchner | 40/436 |
| 2,518,206 | 8/1950 | Vitarelli | |
| 2,915,843 | 12/1959 | Pabst et al. | 40/454 X |
| 3,120,708 | 2/1964 | Silber | 434/348 X |
| 3,707,779 | 1/1973 | Yamamoto | 434/324 X |
| 3,739,069 | 6/1973 | Sanomeier | 434/324 |
| 3,955,297 | 5/1976 | Dela Chauviniere | 40/436 |
| 4,182,071 | 1/1980 | Todokoro | |
| 4,402,158 | 9/1983 | Seki et al. | 446/198 |
| 4,573,928 | 3/1986 | Seki | 434/348 |

Primary Examiner—William H. Grieb
Attorney, Agent, or Firm—Herb Boswell

[57] ABSTRACT

A toy, as for instance a simulated toy computer, has a housing with a window formed in the housing. Behind the window is an indicia strip or carrier which has indicia located on its surface. Positioned in front of the indicia strip is a lenticular screen. The lenticular screen is connected to a mechanism which mechanically moves the lenticular screen with respect to the indicia. Movement of the lenticular screen in front of the indicia gives the appearance that the indicia, in fact, is moving. Actuator keys are provided on the housing for advancing the indicia strip and for activating the movement of the lenticular screen.

16 Claims, 10 Drawing Figures

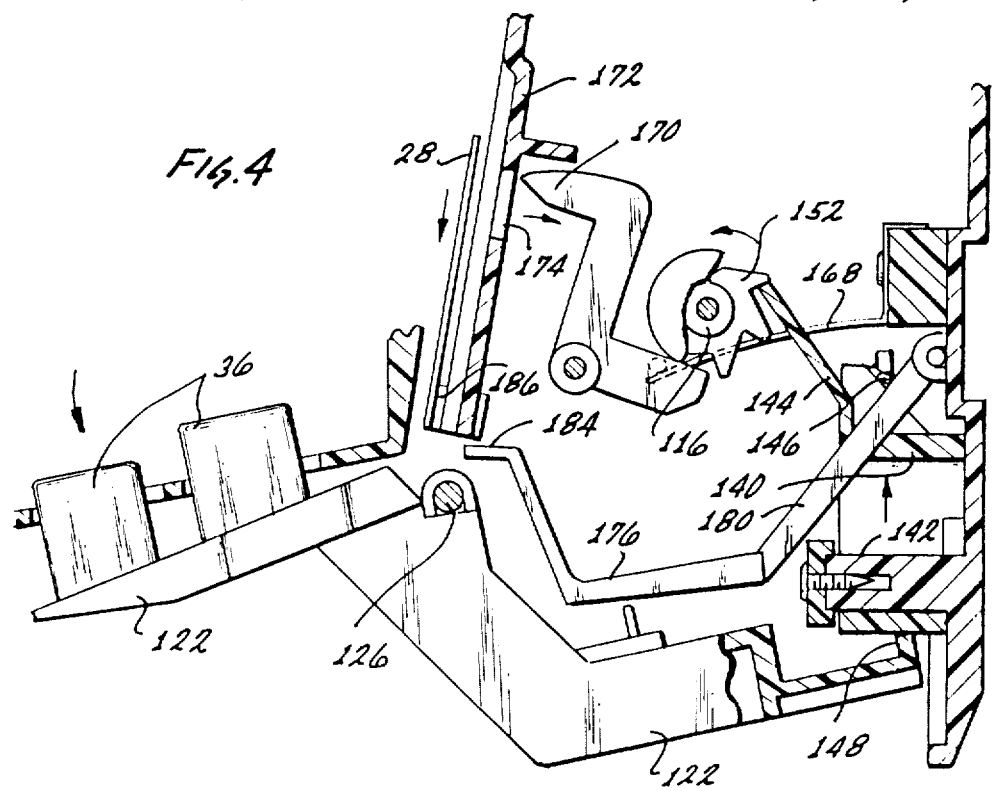
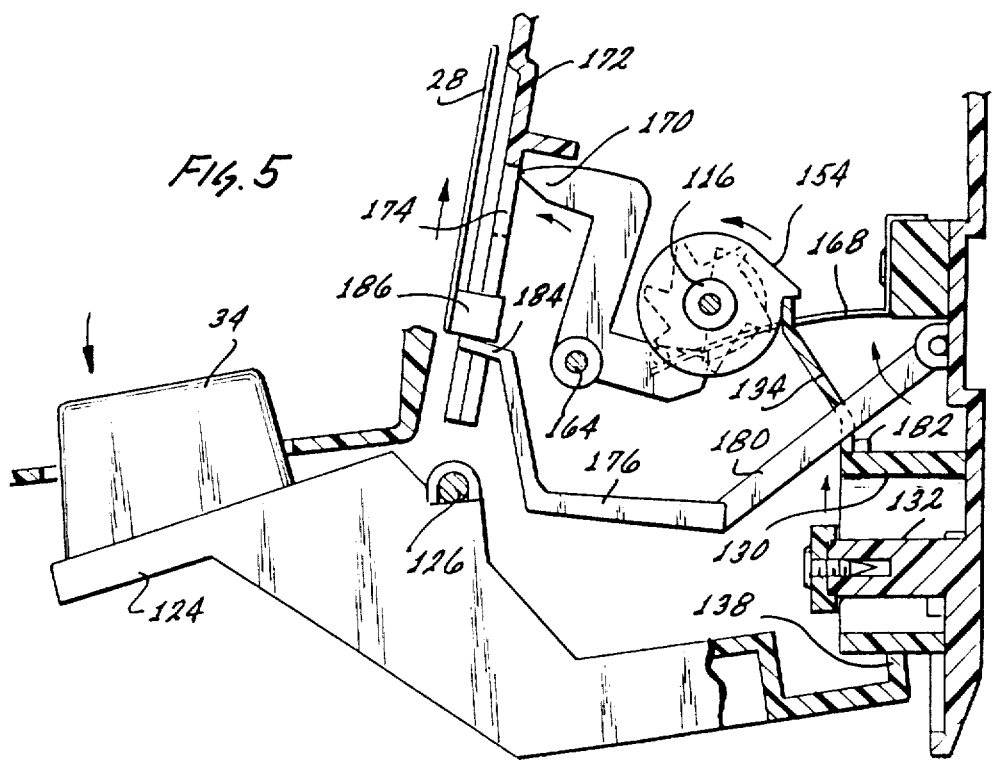

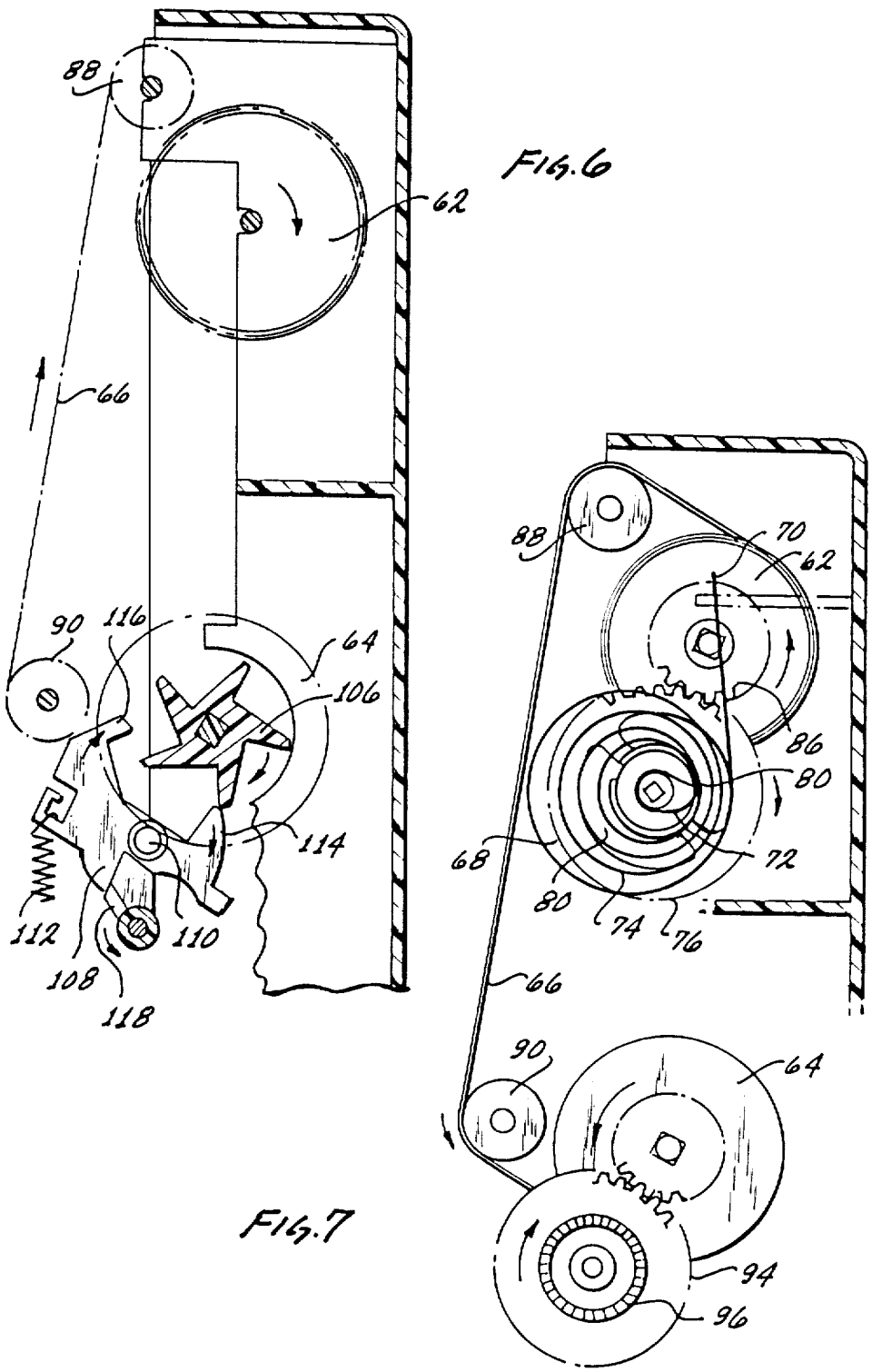

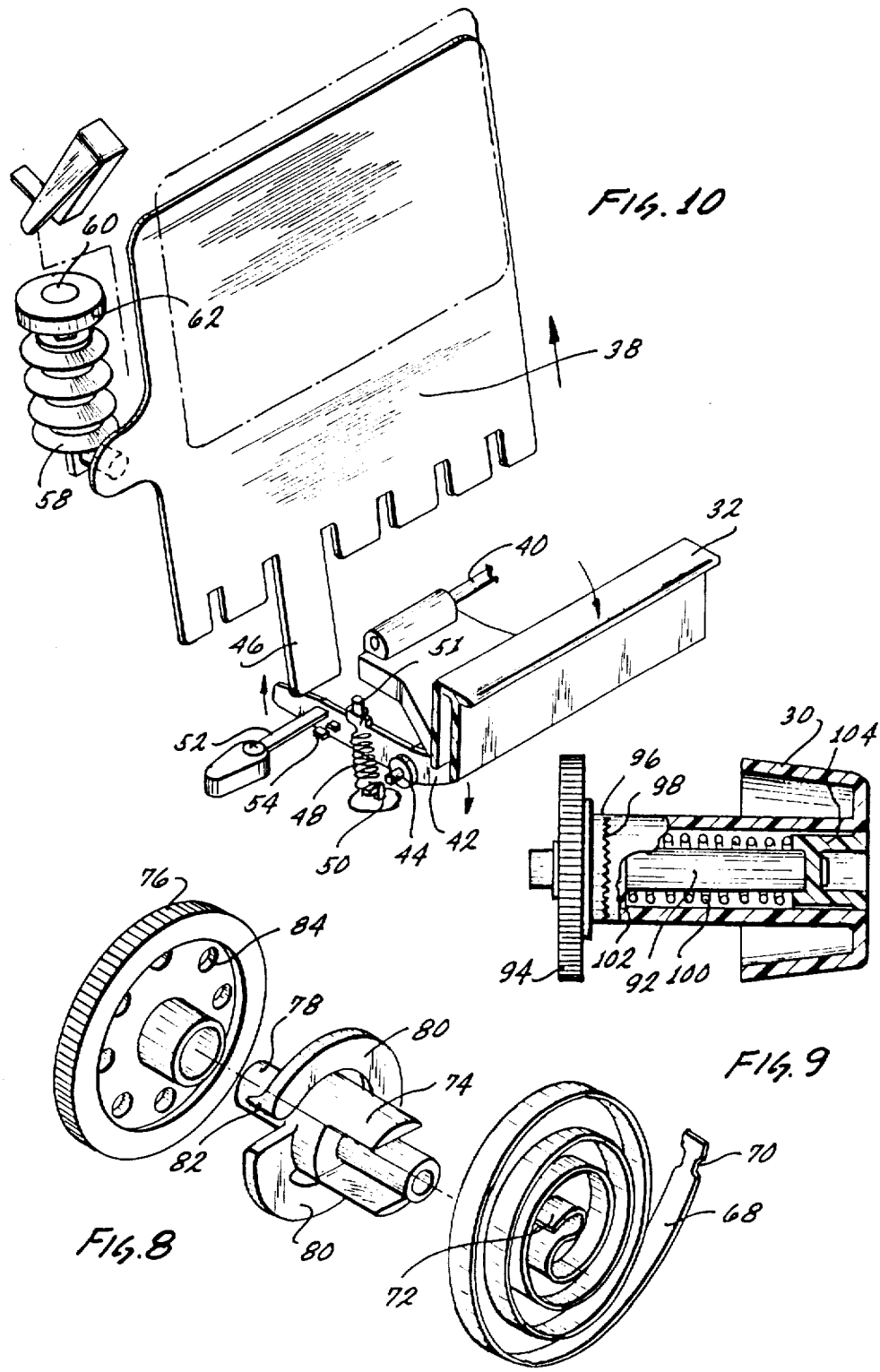

4,693,694

TOY WITH MOVING SCREEN

CROSS REFERENCE TO RELATED APPLICATIONS

This application is a continuation-in-part of my application Ser. No. 665,101 filed Oct. 26, 1984 and entitled "Teaching Toy", the entire contents of which are herein incorporated by reference.

BACKGROUND OF THE INVENTION

This invention is directed to a toy which can be utilized as either a teaching toy or as an entertainment toy. The toy includes an indicia carrier having a plurality of indicia located thereon. The toy includes a window. The indicia carrier is associated with the window allowing viewing of a portion of the indicia on the indicia carrier through the window. Also associated with the window is a lenticular screen. The lenticular screen includes a mechanism for moving the screen whereby the indicia viewable through the screen is animated by the movement of the lenticular screen.

A variety of teaching machines or teaching toys are known which utilize a long strip of paper having questions or other indicia located thereon, which is rolled around rollers and is located within a housing so as to expose only a portion of the paper roller at any one time. Questions and the like can be located on the paper roller with the object of the toy being for the child or other user to correctly guess the answer or otherwise identify the indicia exposed to view. These toys or teaching machines generally have some method for the child to ascertain whether or not a correct guess was made. This includes the flashing of lights on a correct answer, or the appearance of a marble or the like. While these machines certainly are of a utilitarian nature, they generally are of a sophistication level not directed to the preschooler.

With the large scale dissemination and utilization of digital computers, children are being exposed at a very early age to these computers. The computers, however, are even more sophisticated than the above noted teaching machines, and as such, are also unsuitable for use by a small child. Children are capable of extensive learning simply by mimicking older siblings or adults. In view of this, it is considered that there exists a need for a teaching machine which is capable of both giving a small child the impression of operating a computer and at the same time is unsophisticated enough for the small child to be able to operate the teaching machine or teaching toy by himself without adult supervision.

BRIEF DESCRIPTION OF THE INVENTION

In view of the above, it is a broad object of this invention to provide a teaching toy of a level of sophistication capable of being utilized by a preschool age child. It is a further object of this invention to provide a toy which the child can operate without adult supervision in both an educational manner and strictly for entertainment and the like. It is a further object to provide a toy which, because of the simplicity of its engineering principles incorporated therein, is capable of being operated by the child without supervision, yet is of a sophistication level so as to maintain the interest of the child for long periods of time, and provide an educational experience for the child.

These and other objects, as will be evident from the remainder of this specification, are achieved in a toy which comprises a housing; a viewing window located in said housing; and indicia carrier member, said indicia carrier member located in said housing, indicia located on said indicia carrier member, said indicia carrier member located in association with said window whereby at least a portion of said indicia is viewable through said window; a lenticular screen, said lenticular screen located in association with said window and said indicia carrier member so as to be positioned in front of said viewible portion of said indicia; means for moving said lenticular screen with respect to said indicia carrier member, said movement of said lenticular screen with respect to said indicia carrier member changing the perceived view of said viewable portion of said indicia.

In the illustrative embodiment of the specification the viewing means includes a viewing screen which is a lenticular screen so as to provide simulated movement of indicia. The lenticular screen is moved with respect to the indicia so as to create the simulated movement. Preferably, the movement of the lenticular screen is governed by a pneumatic member as for instance a bellows equipped with a valve so as to control air flow into the bellows.

The objects of this invention are further achieved in a simulated toy computer which comprises: a housing having a control portion and a screen portion; a viewing window located on said screen portion; indicia located in said viewing window so as to be viewable by an operator of said toy; a lenticular screen, said lenticular screen positioned with respect to said window in front of said indicia; means for moving said lenticular screen with respect to said indicia so as to change the perceivable view in said indicia in response to movement of said lenticular screen.

The object of the invention is further achieved in a toy which has a housing and a viewing window located in the housing. An indicia strip is located in the housing and includes indicia thereon. An operator control key is operatively connected to the indicia strip so as to move the indicia strip. A viewing window is provided in the housing with a portion of the indicia viewable behind the viewing window and this portion is changed in view of movement of the indicia strip by actuation of the control key. An optical means is positioned in association with the window and the indicia strip so as to be in front of the viewable portion of the indicia strip. The second operator control key is associated with the optical means so as to mechanically move the optical means. The optical means in the illustrative embodiment comprises a lenticular screen having a plurality of lenticules located thereon which cause the image of the indicia to seemingly move as the linticular screen is moved with respect to the indicia.

BRIEF DESCRIPTION OF THE DRAWINGS

This invention will be better understood when taken in conjunction with the drawings wherein:

FIG. 3 is a fragmentary side elevational view in partial section about the line 3—3 of FIG. 1;

FIG. 4 is a view similar to FIG. 3, except certain of the components are located in a different spatial relationship and other components are cut away;

FIG. 5 is a view similar to FIGS. 3 and 4 taken about the line 5—5 of FIG. 1;

FIG. 6 is a fragmentary side elevational view of certain of the components generally located within the upper left hand portion of FIG. 1;

FIG. 7 is a side elevational view in partial section of certain of the components located in the upper right side of FIG. 1;

FIG. 8 is an exploded isometric view of certain of the components located in the central portion of FIG. 7;

FIG. 9 is an elevational view in partial section of a control knob located on the right hand side of the toy as it is seen in FIG. 1, but not exposed for the purposes of FIG. 1; and FIG. 10 is an exploded isometric view of certain of the components which would be in the front part of the toy as seen in FIG. 1.

Figure 1:
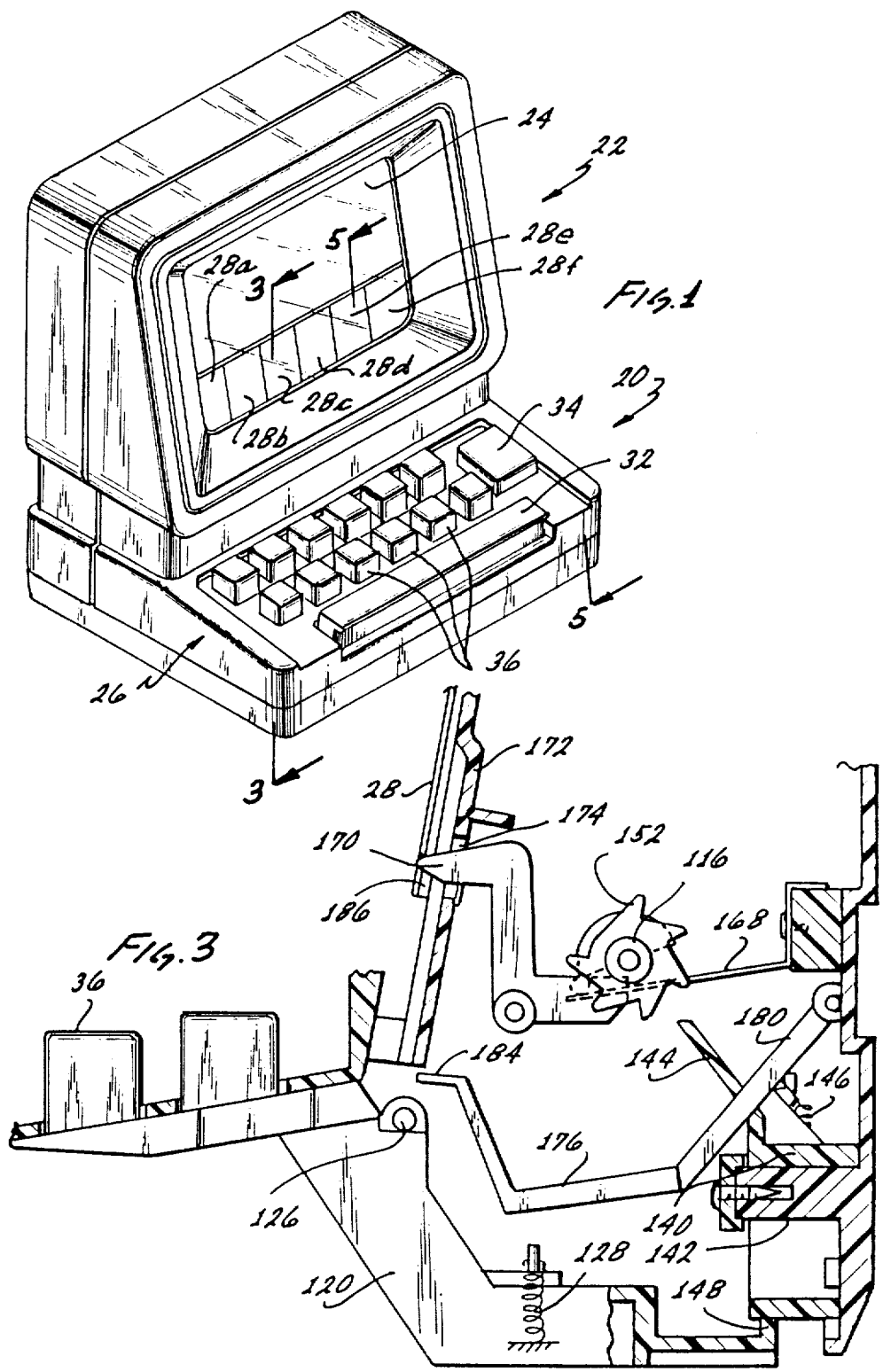
FIG. 1 is an isometric view of the toy of this invention.

The invention illustrated in the drawings and described in the specification utilizes certain principles and/or concepts as are set forth in the claims appended to this specification. Those skilled in the toy arts will realize that these principles and/or concepts are capable of being utilized in a variety of embodiments which may differ from the exact embodiment utilized for illustrative purposes herein. For this reason, this invention is not to be construed as being limited to only the illustrative embodiment, but is to be construed in view of the claims.

DETAILED DESCRIPTION OF THE INVENTION

The toy 20 shown in FIG. 1 is shaped like a miniature computer. It has a housing 22, a screen 24 and keyboard 26 located, thereon. Viewable through the screen 24 are a plurality of cover members collectively identified by the numeral 28. Not seen in FIG. 1, but shown in FIG. 9 is a knob 30 which is located on the toy 20 as it is viewed in FIG. 1, on the right hand side of the toy 20, about in line with the lower edge of the screen 24.

The keyboard 26 can generally be divided into three sections. This includes space bar 32, reset button 34 and keys, collectively identified by the numeral 36.

The toy 20 is operated as follows. First the knob 30 is wound to reset an indicia roller which is inside to a starting position. The child utilizing the toy 22 then pushes the reset button 34. This causes the indicia viewable behind the screen 24 to move up approximately one fourth of the way up the screen 24. In doing this, it also sets the cover members 28 in an elevated, or covered position such that they cover approximately the bottom one fourth of the screen 24 and any indicia which is located thereon. The child now can press any one of the keys 36 to cause the left hand most cover member, cover member 28a to descend downwardly. Pressing another of the keys 36 causes the next to the left hand cover member 28b to descend downwardly. With each press of one of the keys 36, the next in line of the cover members 28, in moving from left to right, moves downwardly from a covered to an uncovered position so as to expose any indicia located beneath the particular cover member.

When all of the cover members 28 have been moved from the cover to the uncovered position, the totality of all of the indicia viewable on the screen 24 has been exposed to the view of the child operator. The child now pushes the reset button 34 a further time to cause the indicia to move upwardly about one fourth of the height of the screen and to once again reset the cover members 28 in the covered position. As before, by depressing one of the keys 36, the cover members 28 are sequentially moved from left to right from the covered to the uncovered position.

The indicia which is exposed through the screen 24 is designed so the child can guess the answer to a question such as "What color is this", the next in line of a number, the next in line of the ABC 3s or the like. As for instance, if a picture of a horse is shown on the portion of the indicia viewable on the screen 24 which is located totally above any of the covered members 28, the word "horse" would be located behind the covered members 28 when they are in the covered position. The child tries to guess what the picture is. If the child needs a clue, the child pushes one of the keys 36, moving the first cover member 28a from its covered to its uncovered position. At this time, the first letter, "H" is uncovered on the bottom part of the screen 24. If this is not a sufficient clue for the child, the child then pushes a further of the keys 36 to cause the cover member 28b to move from the covered to the uncovered position, exposing the letter "O" to give a further clue. The operation of the toy 20 is repeated until all of the covered members 28 are in the uncovered position, and at that time the reset button 34 is pushed down to move the indicia on the screen 24 and to once again set the cover members 28 in the covered position.

At any time the child may push down the space bar 32. When the space bar is pushed down, it sets a certain mechanism as hereinafter described, causing a lenticular screen 38 (a screen formed as a lenticular lens having a plurality of lenticles located thereon), seen in FIG. 10, to move in front of the screen 24. The indicia which is viewable through the screen 24 is printed in such a manner such that in combination with the movement of the lenticular screen 38, the indicia appears to move on the screen 24, giving the appearance of graphic movement on the screen 24.

Referring now to FIG. 10, the mechanism of action of the lenticular screen 38 under the action of the space bar 32 is shown. The space bar 32 is hinged via an axle 40 to the inside of the housing 22. This allows the space bar 32 to move upwardly and downwardly. Directly underneath the space bar 32 is a lever 42 which is hinged via axle 44 to the inside of the housing 22. The lever 42 is a first class lever, with the space bar 32 pressing on one end and its other end positioned underneath an extension 46 projecting downwardly from the lenticular screen 38. A spring 48 extends between a tab 50 located on the bottom of the inside of the housing 22 and a small peg 51 located on the upper surface of the lever 42. This biases the arm of the lever 42 which contacts the extension 46 of the screen 38 downwardly so as to bias the other end of this lever 42 upwardly to contact the bottom side of the space bar 32 to bias the space bar 32 upwardly.

When the space bar 32 is pressed, it contacts the lever 42, rotating the lever 42 about its axle 44, such that it lifts the lenticular screen 38 upwardly. A small plastic member 52 is attached to the inside of the housing 22 and projects toward the lever 42. The lever 42 includes two small tabs collectively identified by the numeral 54 located on its side, which contact the end of the plastic member 52 as the lever 42 rocks about the axle 44. This produces a clicking sound in association with the movement of the lever 42.

The lenticular screen 38 includes a side extension 56 which is connected to the bottom of a bellows 58. The bellows 58 operates as does the bellows in U.S. Pat. No. 4,402,158. For the purposes of this specification, the entire disclosure of U.S. Pat. No. 4,402,158 is herein incorporated by reference. Briefly, the bellows 58 includes a diaphragm 60 located on its upper surface which sits on top of a roughened surface having a hold in the middle as per the teachings of U.S. Pat. No. 4,402,158. A cap 62 holds the diaphragm 60 on the roughened surface. When bellows 58 is compressed, air is expelled out of the bellows. Air then slowly seeps back into the interior of the bellows 58 allowing the bellows to slowly expand. The end of the bellows 58 near the cap 62 is fixed to the interior of the housing 22. As such, it is immovable. Upon compression of the bellows 58, and slow expansion of the same, the bellows 58 thus pushes downwardly on the extension 56 to slowly move the lenticular screen 38 downwardly. This slow movement of the lenticular screen 38 across the screen 24 results in the simulated action of indicia on the screen 24 as was described above.

Figure 2:
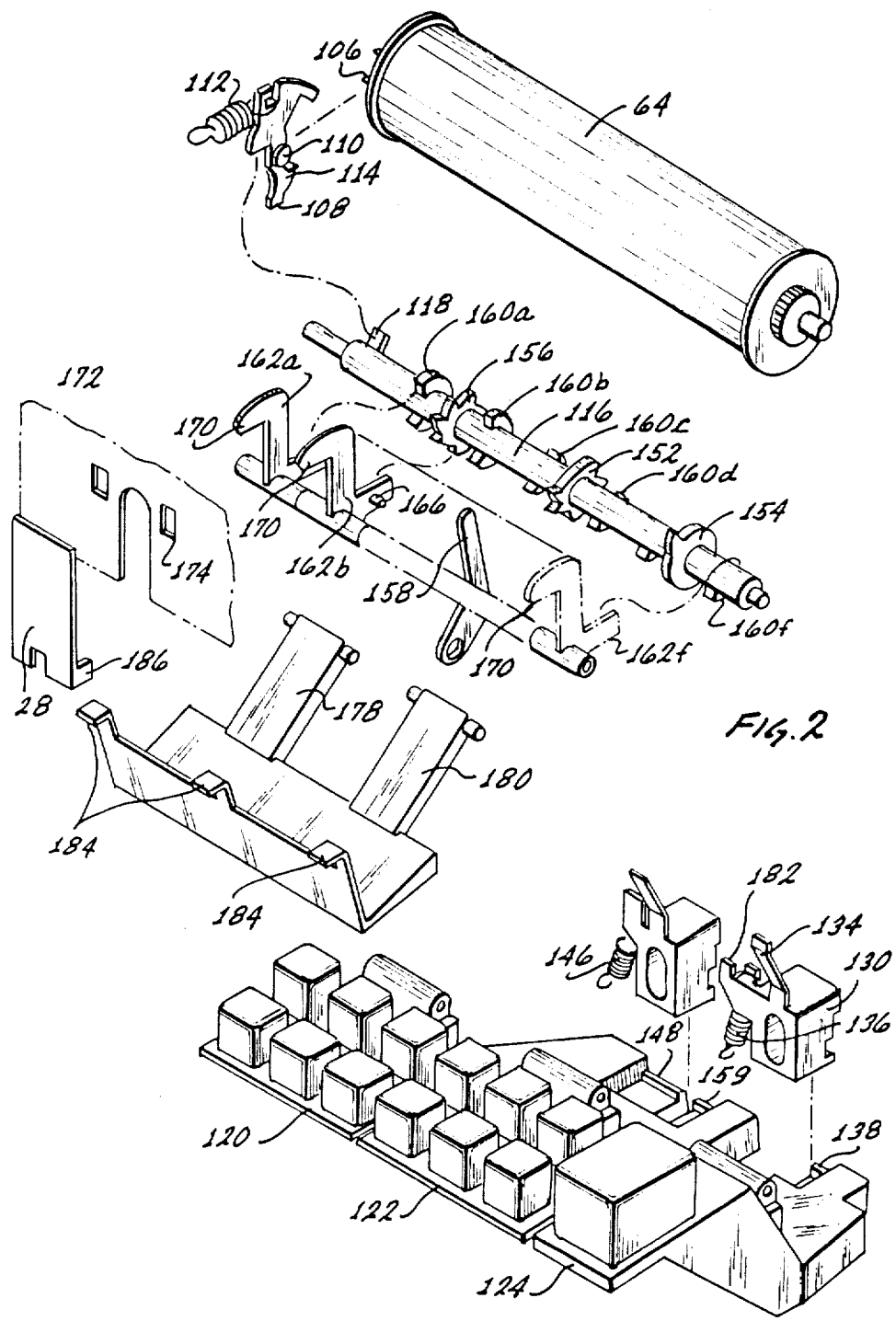
FIG. 2 is an exploded isometric view showing certain of the operating mechanisms of the toy of Fig. 1.

In reference now to FIGS. 2, 6 and 7, appropriately suspended within the housing 22 is an upper roller 62 and a lower roller 64. Extending between the rollers 62 and 64 is a flexible elongated paper roll 66 serving as an indicia carrier. The paper roll 66 is attached at one of its ends to roller 62 and at the other of its ends to roller 64. It is wound onto lower roller 64 by rotation of knob 30 at the start of use of the toy 20. On each press of the reset button 34, a segment of the paper roll 66 moves off of lower roller 64 and a further segment is rolled onto upper roller 62. The area of the paper roll 66 which is located between the two rollers 62 and 64 is exposed through the screen 24. The paper roll 66 includes a plurality of individual indicia printed thereon as was described above.

In reference now to FIGS. 7 and 8, a coil spring 68 is fixed via end 70 to the inside of the housing 22. Its other end, its inside end 72, attaches to a combination winding spindle and clutch member 74. A gear 76 is located about the axle portion 78 of the winding spindle 74. Gear 76 is free to turn on this axle portion 78. The winding spindle 74 includes two spring arms 80, each having a small dog 82 located on their end. The gear 76 includes a plurality of holes collectively identified by the numeral 84 which can be engaged by the dogs 82. If the winding spindle 74 is turned clockwise with respect to the gear 76 and the gear 76 is fixed for any reason, such as all of the paper roll 66 has been wound on the upper roller 62, the spring arms 80 will flex away from the gear 76 allowing the dogs 82 to slip with respect to the holes 84. However, if the winding spindle 74 is biased counterclockwise by the uncoiling action of the coil spring 68, the dogs 82 are fixed within the holes 84 and as such the gear 76 will also rotate counterclockwise in conjunction with the uncoiling of the coil spring 68.

The gear 76 meshes with a gear 86 formed on one end of the upper roller 62. This connects the upper roller 62 to the coil spring 68. When the paper roll 66 is wound onto the lower spindle 64 at the start of play of the toy 20, this causes counterclockwise rotation of the upper roller 62 and its associated gear 86. This, in turn, rotates the gear 76 clockwise to coil the coil spring 68. During play of the toy 20, upon each depression of the reset button 34, the bias induced into the coil spring 68 causes counterclockwise rotation of the gear 76, which in turn rotates the gear 86 and the upper roller 62 clockwise, as seen in FIG. 7, to wind the paper roll 66 onto the upper roller 62.

In passing from the upper roller 62 to the lower roller 64, the paper roll 66 passes over two idle rollers, upper idle roller 88 and lower idle roller 90. These idle rollers 88 and 90 position the paper roll 66 directly behind the lenticular screen 38.

Referring now to FIGS. 7 and 9, winding of the paper roll 66 onto the lower roller 64 is shown. The knob 30 slips over a boss 92 which is formed as a part of a gear 94. The gear 94 includes a small re-entrant gear 96 on its side. The knob 30 further includes a corresponding re-entrant gear 98 on its inner end. The re-entrant gears 98 and 96 mesh with one another to transfer rotation of the knob 30 to the gear 94. A spring 100 is positioned around the boss 92 and is compressed between the bottom 102 of the knob 30 and a plug 104 which is attached via a screw to the top of the boss 92. The compression spring 100 biases the re-entrant gear 98 into engagement with re-entrant gear 96 to transfer motion of the knob 30 to the gear 94. If the gear 94 however is fixed because all of the paper roll 66 is located on the lower roller and the knob 30 is turned, the re-entrant gear 98 will slip along the re-entrant gear 96 to act as a clutch mechanism to prevent ripping of the paper roll 66 due to overtightening of the knob 30.

The gear 94 meshes with a gear 96 formed on the right hand side of the lower roller 64 to transfer motion from the knob 30 to the lower roller 64 in order to wind the paper roll 66 onto the lower roller 64 and concurrently coil the coil spring 68.

On the other side, the left side of the lower roller 64, is a ratchet wheel 106. It is fixed to the lower roller 64 and thus rotates in conjunction with the lower roller 64. A pawl 108 is pivotally attached via its axle 110 to the interior of the housing 22. A small spring 112 attaches between the pawl 108 and the interior of the housing 22. This biases the pawl to rotate counterclockwise as seen in FIG. 6. The pawl 108 interacts with the ratchet wheel 106 to either hold the lower roller 64 fixed or to allow it to move by stepwise rotation. This is accomplished by first locking of the ratchet wheel 106 by the end 114 of the pawl such that the ratchet wheel 106 cannot rotate clockwise. If the pawl 108 is rotated clockwise about its axle 110, the end 114 is moved away from the ratchet wheel 108 allowing the ratchet wheel 106 to turn a slight increment of rotation until the end 116 contacts a further tooth on the ratchet wheel 106. Upon counterclockwise rotation of the pawl 108, the end 116 is freed from the ratchet wheel 106 with the end 114 then contacting the ratchet wheel 106 to once again lock the ratchet wheel 106 against further counterclockwise rotation. Since the ratchet wheel 106 has five teeth, upon each rocking movement of the pawl 108 about its axle 110, the lower roller 64 is allowed to rotate one fifth of a resolution.

A control rod 116 is rotatably mounted so as to extend across the width of the toy 20 within the interior of the housing 22 just behind the bottom of the screen 24. The control rod 116 includes a small cam 118 on its lowermost left hand side which is positioned to interact with the pawl 108 to rotate the pawl 108 about its axle. With each complete rotation of the control rod 116 as hereinafter described, the cam 118 will contact the pawl 108 and rock the pawl 108 about its axle 110 allowing for movement of the ratchet wheel 106 through one fifth of a degree of rotation. As such, the lower roller 64 moves one fifth of a resolution for every complete rotation of the control rod 116.

The totality of the keys 36 are mounted on two key members 120 and 122. Together the keys 36 and the key members 120 and 122 comprise a first operator actuator which is ultimately associated with and interacts with the control rod 116. The reset button 32 is mounted on a space bar member 124 which comprises a second operator actuator which in turn is also associated with the control rod 116 and interacts with it. Each of the members 120, 122 and 124 is independently mounted on an axle 126 which extends across the interior of the housing 22 and is supported therein. This pivotally mounts the members 120, 122 and 124 beneath the keyboard 26 of the toy 20. Two small springs, only one of which can be seen, spring 128, attach to the respective members 120 and 122 to bias these members to rotate clockwise as seen in FIG. 3 which in turn bias the keys 36 upwardly such that they extend up and out of the keyboard 26. When the keys 36 are depressed, this rotates the members 120 and 122 about the axle 126, stretching the springs 128, and when the keys 36 are released, the spring 128 returns the keys 36 to an upward position.

A small slide member 130 is mounted to the interior of the housing 22 by fitting over a boss 132. The slide member 130 includes a contact arm 134 which extends upwardly and forwardly from the member 130. A small spring 136 extending between the slide member 130 and the interior of the housing 22 biases the slide member 130 downwardly. The slide member 130 contacts the end 138 of the reset member 124. The bias of the spring 136 pushes the end 138 downwardly such that the reset member 124 is rotated about the axle 126 to bias the reset button 34 upwardly.

A second slide member 140 is located next to the slide member 130. It is mounted about a boss 142 and includes a contact arm 144. A spring 146 biases the slide member 140 downwardly such that it contacts both end 148 of key member 120 and end 150 of key member 122. The spring 146 tends to urge the key members 120 and 122 both to rotate counterclockwise about the axle 126. However, it will be remembered that these are also independently biased by the small springs 128.

A ratchet wheel 152 is formed as a portion of the control rod 116. It has six teeth located thereon. However, as is evident from viewing FIG. 3, the position where a seventh tooth would be located is vacant. When any of the keys 36 are depressed, they will rotate one or the other of the key members 120 or 122 about the axle 126 such that one or the other of the respective ends 148 or 150 of these members contacts the slide member 140 to lift the slide member 140 upwardly. This moves the contact arm 144 upwardly. It is positioned so as to engage the ratchet wheel 152. Upon depression of any of the keys 36, the engagement of the contact arm 144 with the ratchet wheel 152 rotates the ratchet wheel 152 and the control rod 116 of which it is an integral part. The control rod 116 is rotated one seventh of a full revolution upon each engagement of the contact arm 144 with the ratchet wheel 152.

A second ratchet wheel 154 is also integrally formed with the control rod 116. This ratchet wheel, however, only includes one tooth. The one tooth is positioned so as to axially line up with the space wherein the tooth is missing on the ratchet wheel 152. The ratchet wheel 154 is positioned where it can be contacted by the contact arm 134 on the slide member 140. However, because there is only one tooth on the ratchet wheel 154, it will only be contacted by the contact arm 134 when that one tooth is positioned as is seen in FIG. 5. At this time, and at this time only, will depression of the reset button 34 be transmitted to the control rod 116 to rotate it.

Assuming the control rod 116 has just been rotated by depression of the reset button 34, the keys 36 can be depressed six times in a row, with each depression of the keys 36 resulting in movement of the contract arm 144 to contract the ratchet wheel 152 and rotate the same with rotation concurrently transmitted to the control rod 116. After the keys 36 have been depressed six times, the ratchet wheel 154 is now in position such that, upon depression of the reset button 34, the reset button 34 will cause rotation of the control rod 116. The cam 118 is positioned with respect to the tooth on the ratchet wheel 154 such that when the control rod 116 is rotated ultimately by the depression of the reset button 34 the cam 118 will interact with the pawl 108 to release the lower roller 64 allowing the bias of the coil spring 68 to move the paper roll 66 across the screen 24.

A further ratchet wheel 156 is located toward the left hand side of the control rod 116. This interacts with a small plastic spring arm 158 to make a clicking sound upon each incremental rotation of the control rod 116. Thus, independent of whether the control rod 116 is moved by the contract arm 134 or contact arm 144, a clicking noise will emanate upon rotation of the control rod 116.

The control rod 116 includes six additional cams, cams 160 a through f. These cams ultimately control movement of the cover members 28 a through f from their covered to their uncovered positions. The cams 160 a through f are circumferentially spaced from each other around the circumference of the control rod 116, six bell cranks, 162 a through f are independently mounted about an axle 164 such that they can independently rotate about the axle 164. Each of the bell cranks 162 is positioned with respect to the control rod 116 such that one of the cams 160 will contact the lower arm of one of the bell crank 162 to rotate the bell crank 162 clockwise as seen in FIG. 3 about the axle 164. Each of the bell cranks 162 includes a small peg 166 which extends sideways out of its lower arm. Six springs, collectively identified by the numeral 168 extend forward from inside of the back of the housing 22 and are positioned underneath one of the pegs 166 on one of the bell cranks 162. This biases the bell cranks 162 counterclockwise about the axle 164.

The cams 160 as they move from left to right from cam 160a toward cam 160f are decreasingly smaller in size as measured arcuately or circumferentially around the cam. The control rod 116 is moved counterclockwise as viewed in the Figs. The cams 160 are positioned circumferentially on the control rod 116 such that upon the first rotation of the control rod 116 by interaction of the contact arm 44 contacting the ratchet wheel 152 because of depression of the one of the keys 36, cam 160a will contact the bell crank 162a to rotate the bell crank 162a clockwise. Since the cam 160a has the greatest arcuate dimension, once the cam 160a contacts the bell crank 162a and rotates the bell crank 162a from the position seen in FIG. 3 to the position seen in FIG. 4, it holds the bell cranks 162a in this position until the ratchet wheel 154 is contacted by the control arm 134 as a result of the reset button 34. When this happens, the cam 160a moves clear of the bell crank 162a allowing it to be rotated counterclockwise under the influence of its spring 168 back to the position seen in FIG. 3.

Each of the cams 160 in reading from left to right, i.e., from cam 160a to cam 160f, in turn engage their respective bell crank 162 to rotate it counterclockwise from the position for bell crank 162a in FIG. 3 to the position for bell crank 162a in FIG. 4. Thus, first bell crank 162a is contacted and rotated clockwise and held there. Next bell crank 162b is contacted and rotated clockwise and held there. The remainder of the bell cranks are contracted and rotated in turn in a like manner.

The vertical arm of the bell cranks 162 include a forward projection 170. The projections 170 interact with the cover member 28. A plate 172 fits within the housing 22 just below the screen 24. The plate 172 has a plurality of holes collectively identified by the numeral 174. The forward projections 170 of each of the bell cranks 162 can fit into one of the holes 174. The cover members 28 are held between the plate 172 and the interior of the housing 22 just below the screen 24. They are free to slide up and down between these two structures. When raised to their covered position as hereinafter described, the bottom of the cover members 28 are lifted above one of the holes 174 such that the forward projection 170 on the respective bell crank 162 can slip beneath it as seen in FIG. 3 to hold the cover member 28 in the upward or covering position. When the bell cranks 162 are rotated clockwise as seen in FIG. 4, the forward projection 170 is pulled from beneath the respective cover member 28 out of the respective hole 174 allowing the cover member 28 to descend downwardly to the uncovered position as seen in FIG. 4. Because the bell cranks 162 are sequentially rotated from the position seen in FIG. 3 to the position seen in FIG. 4, the respective cover members 28 a through f are sequentially moved from their covered to their uncovered position. This sequentially opens, from left to right, the bottommost portion of the screen 24 for viewing of the indicia located beneath the cover members 28.

The cover members 28 are simultaneously moved from their uncovered position upon depression of the reset button 34. A repositioning member 176 is pivotally mounted to the back of the inside of the housing 22. It includes two arms 178 and 180. Arm 180 is positioned so as to be contacted by extension 182 formed on the slide member 130. When the slide member 130 is moved upwardly upon depression of the reset button 34, the extension 182 contacts the arm 180 lifting it and the repositioning member 176 upwardly. The repositioning member 176 includes three lifting arms, collectively identified by the numeral 184. These are positioned so as to contact a small lifting tab collectively identified by the numeral 186 formed on each of the cover members 28.

The cams 160 are positioned on the control rod 116 such that they slip off of the ends of the bell cranks 162 when the control rod 116 is rotated via interaction of the extension 134 on the sliding member 130 with the ratchet wheel 150. Simultaneously, as the sliding member 130 is lifted, its extension 182 interacts with the repositioning member 176 and consequently the cover member 28 are lifted upwardly form the uncovered to the covered position in conjunction with repositioning of the bell cranks 162 in their counterclockwise position seen in FIG. 3. As soon as the respective cover members 28 clear the ends of the forward projection 170 on the respective bell cranks 162, the forward projection 170 of the bell cranks 162 can rotate inwardly through the holes 174 so as to become lodged underneath the bottom of the cover members 28 to hold them in the covered position.

FIG. 5 shows movement of the reset button downwardly with concurrent upward movement of the slide member 130 and lifting of the respositioning member 176 to lift the cover members 28. Just as the cover members 128 are lifted such that their bottom edge clears the holes 174 it can be seen that the cam 160 shown in phantom line clears the end of the bell crank 162, allowing it to rotate counterclockwise so as to hold the cover members 28 in their upward position.

I claim:

1. A toy which comprises:
   a housing;
   a viewing window located in said housing;
   an indicia carrier member, said indicia carrier member located in said housing, indicia located on said indicia carrier member, said indicia carrier member located in association with said window whereby at least a portion of said indicia is viewable through said window;
   a lenticular screen, said lenticular screen located in association with said window and said indicia carrier member so as to be positioned in front of said viewable portion of said indicia;
   means for moving said lenticular screen with respect to said indicia carrier member, said movement of said lenticular screen with respect to said indicia carrier member changing the perceived view of said viewable portion of said indicia;
   carrier means for movably supporting said indicia carrier member;
   said indicia carrier member being movably located on said carrier means so as to move with respect to said window, said movement of said indicia carrier member with respect to said window positioning different portions of said indicia carrier member with respect to said window allowing viewing of said different portions of said indicia strip;
   at least one operator actuator located on said housing;
   means for moving said indicia carrier member on said carrier means, said means operatively connecting between said operator actuator and said carrier means whereby movement of said operator actuator is transmitted to said carrier means to move said indicia carrier member with respect to said window.

2. The toy of claim 1 including:
   at least one further operator actuator, said further operator actuator operatively associated with said means for moving said linticular screen, said further operator actuator moveably mounted on housing;
   said means for moving said linticular screen moving said linticular screen in response to said movement of said further operator actuator on said housing.

3. The toy of claim 1 wherein:
   said means for moving said lenticular screen includes pneumatic control means, said pneumatic control means for controling movement of said lenticular screen with respect to said indicia carrier member.

4. The toy of claim 2 including:
   said means for moving said lenticular screen includes pneumatic control means, said pneumatic control means for controling movement of said lenticular screen with respect to said indicia carrier member.

5. The toy of claim 3 including:

further sensory output means for outputting a further sensory output, said further sensory output means located on said housing;

further sensory output means control means for controlling said further sensory output means, said further sensory output means control means operatively associated with said further sensory output means so as to control said further sensory output means.

6. The toy of claim 5 including;
a further sensory output means operator actuator, said further sensory output means operator actuator moveably mounted on said housing.

7. A toy which comprises:
a housing;
said housing including a control portion and a screen portion;
a viewing window located in said screen portion;
an indicia carrier, said indicia carrier located in said housing in association with said window whereby at least a portion of said indicia carrier is viewable through said window;
a lenticular screen, said lenticular screen located in association with said window and said indicia carrier so as to be positioned in front of said viewible portion of said indicia carrier;
pneumatic means for moving said lenticular screen, said pneumatic means located on said housing in operative association with said lenticular screen whereby said pneumatic means moves said lenticular screen with respect to said indicia carrier to change the perceived view of said viewable portion of said indicia carrier.

8. The toy of claim 7 including:
said pneumatic means including an air chamber means, said air chamber means having an interior for containing a volume of air;
said pneumatic means further including an opening into said interior of said air chamber means;
said pneumatic means further including air flow control means associated with said opening in said air chamber means, said air flow control means for controlling the flow of air between the interior of said air chamber means and the ambient environment whereby movement of said lenticular screen with respect to said indicia carrier is controlled by movement of air between the interior of said air chamber means and the ambient environment through said opening under the control of said air chamber means control means.

9. A toy which comprises:
a housing;
a viewing window located in said housing;
an indicia strip;
an indicia strip carrier, said indicia strip carrier located in said housing, said indicia strip located on said indicia strip carrier in association with said window whereby at least a portion of said indicia strip is viewable through said window;
a first operator control key moveably mounted on said housing;
linking means for transferring movement, said linking means operatively connecting between said first operator control key and said indicia strip carrier;
said indicia strip moveably located on said indicia strip carrier and moving on said indicia strip carrier in response to movement of said first operator control key on said housing;

a screen means for changing an image, said screen means located in association with said window and said indicia strip so as to be positioned in front of said viewable portion of said indicia strip;
a second operator control key moveably located on said housing;
means for moving said screen means with respect to said indicia strip, said means for moving said screen means operatively associated with said second operator control key whereby movement of said screen means with respect to said indicia strip is in response to movement of said second operator control key with respect to said housing.

10. The toy of claim 9 wherein:
said means for moving said screen means includes pneumatic control means, said pneumatic control means for controlling movement of said screen means with respect to said indicia strip.

11. The toy of claim 10 wherein:
further sensory output means for outputting a further sensory output, said further sensory output means located on said housing;
further sensory output means control means for controlling said further sensory output means, said further sensory output means control means operatively associated with said further sensory output means so as to control said further sensory output means.

12. The toy of claim 10 wherein:
a further sensory output means operator actuator, said further sensory output means operator actuator moveably mounted on said housing.

13. A simulated toy computer which comprises:
a housing having a control portion and a screen portion;
a viewing window located on said screen portion;
indicia located in said viewing window so as to be viewable by an operator of said toy;
a lenticular screen, said lenticular screen positioned with respect to said window in front of said indicia;
means for moving said lenticular screen with respect to said indicia so as to change the perceivable view of said indicia in response to movement of said lenticular screen;
said means for moving said lenticular screen including pneumatic control means, said pneumatic control means including an air chamber, said air chamber having an interior and an opening into said interior.
air flow control means for controlling air flow, said air flow control means associated with said air chamber opening for controlling air flow through said opening whereby movement of said lenticular screen is controlled by air flow through said opening.

14. The toy of claim 13 including:
an indicia carrier, said indicia located on said indicia carrier, said indicia carrier moveably located in said screen portion of said housing in association with said window, movement of said indicia carrier in said housing changing the indicia viewable through said window;
a control key, said control key located on said control portion of said housing;
linking means for conveying movement, said linking means operatively located with said control key and said indicia carrier whereby said indicia carrier is moved by said linking means in response to movement of said control key.

15. The toy of claim 14 including;
a further control key, said further control key moveably located on said control portion of said housing;
a further linking means for conveying movement, said further linking means operatively associated with said further control key and said means for moving said lenticular screen whereby movement of said further control key is transferred to said means for moving said lenticular screen.

16. A simulated toy computer which comprises:
a housing having a control portion and a screen portion;
a viewing window located on said screen portion;
indicia located in said viewing window so as to be viewable by an operator of said toy;
a lenticular screen, said lenticular screen positioned with respect to said window in front of said indicia;
means for moving said lenticular screen with respect to said indicia so as to change the perceivable view of said indicia in response to movement of said lenticular screen;
said means for moving said lenticular screen includes a bellows, said bellows moving a valve means for controlling air flow into said bellows.

* * * * *

UNITED STATES PATENT AND TRADEMARK OFFICE
CERTIFICATE OF CORRECTION

PATENT NO. : 4,693,694
DATED : SEPTEMBER 15, 1987
INVENTOR(S) : YOSHIZO SEKI

It is certified that error appears in the above-identified patent and that said Letters Patent is hereby corrected as shown below:

Column 3, line 29, "DETAILLED" should be --DETAILED--,

Column 4, line 8, "ABC 3s" should be --ABC's--,

Column 5, line 6, "hold" should be --hole--,

Column 8, line 9, "contract" should be --contact--,

Column 9, lines 10 and 11, "contracted" should be --contacted--,

Column 10, line 6, "respositioning" should be --repositioning--,

Column 10, line 8, "128" should be --28--,

Column 11, line 25, "viewible" should be --viewable--,

Column 12, line 5, and Column 13, lines 6 and 7, "moveably" should be --movably--.

Signed and Sealed this

Twenty-eighth Day of June, 1988

Attest:

DONALD J. QUIGG

*Attesting Officer*         *Commissioner of Patents and Trademarks*